United States Patent [19]

de Gennes

[11] 4,039,059
[45] Aug. 2, 1977

[54] DIAPHRAGM CLUTCH ASSEMBLY

[75] Inventor: Gerard de Gennes, Senlis, France

[73] Assignee: Societe Anonyme Francaise du Ferodo, France

[21] Appl. No.: 668,140

[22] Filed: Mar. 18, 1976

[30] Foreign Application Priority Data

Mar. 27, 1975  France .................. 75.09588
Feb. 12, 1976  France .................. 76.03810

[51] Int. Cl.² .......................... F16D 13/71
[52] U.S. Cl. ............................. 192/89 B
[58] Field of Search ..................... 192/89 B

[56] References Cited
U.S. PATENT DOCUMENTS 3,595,355   7/1971   Maucher ............... 192/89 B

FOREIGN PATENT DOCUMENTS 2,121,879  12/1972   Germany ............ 192/89 B
2,441,141   6/1975   Germany ............ 192/89 B Primary Examiner—Benjamin W. Wyche
Attorney, Agent, or Firm—Diller, Brown, Ramik & Wight

[57] ABSTRACT

An assembly for a diaphragm clutch comprises a clutch cover, a diaphragm, connecting means pivotally connecting the diaphragm to the cover, and a supporting washer interposed between the connecting means and the diaphragm. The connecting means comprises a head element which abuts the front face of the cover, and claws which extend through openings in the cover and the diaphragm and which have turned-over ends which engage the supporting washer. The head element of the connecting means is of arcuate construction, forming part of a cylinder whose generatrices are parallel to the axis of the assembly.

11 Claims, 15 Drawing Figures

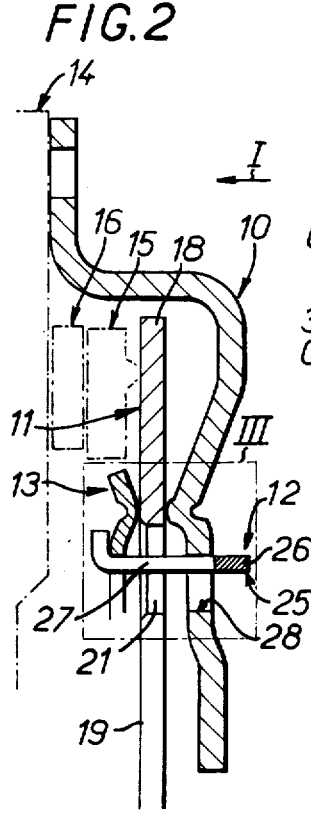
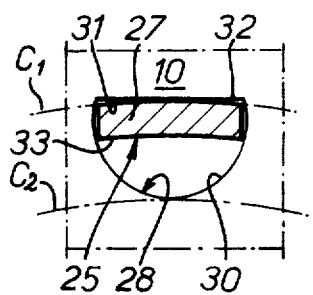
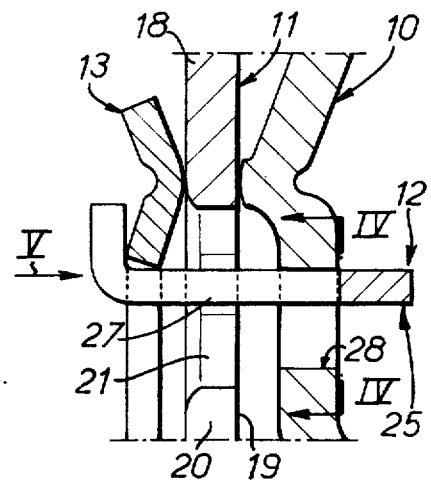
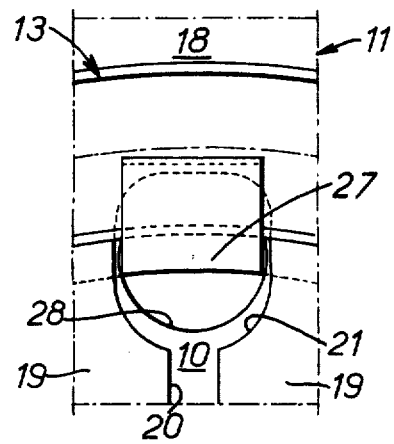
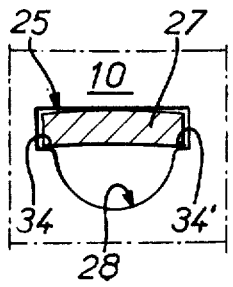
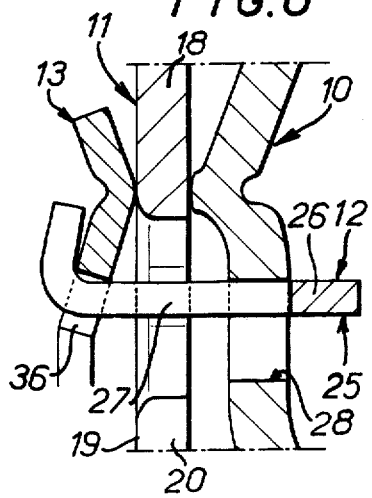
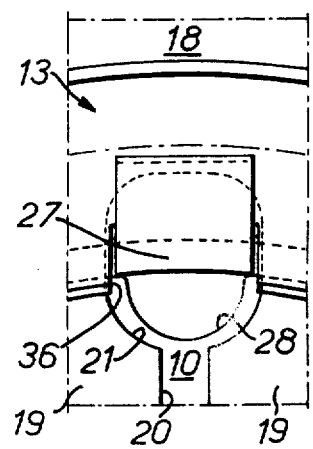

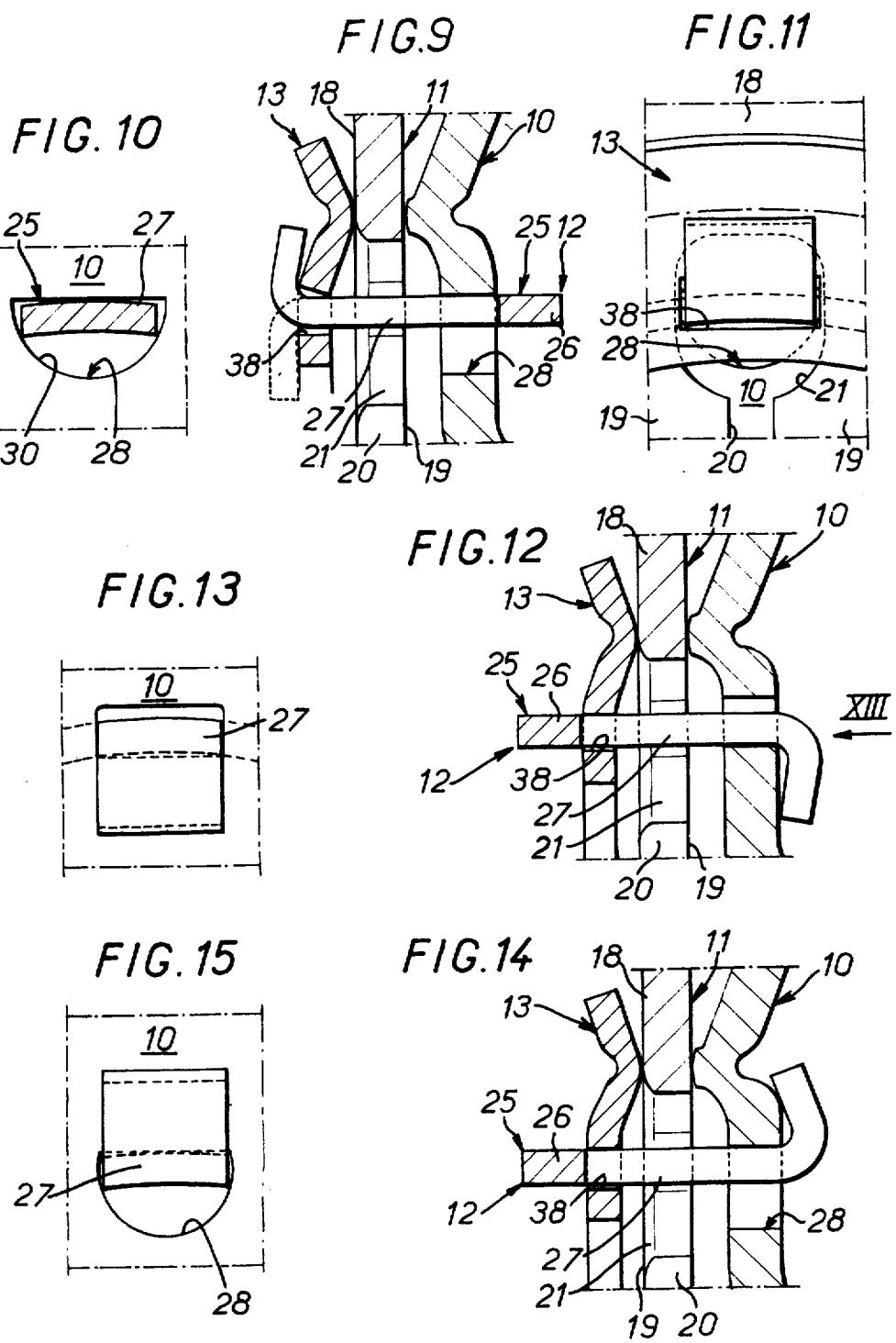

DIAPHRAGM CLUTCH ASSEMBLY

BACKGROUND OF THE INVENTION

This invention relates to clutches, particularly for automobile vehicles. More particularly, the invention relates to diaphragm clutches which comprise a reaction plate adapted to be rigidly connected to a first shaft which is generally a driving shaft, a friction disc mounted for axial movement in relation to the reaction plate and adapted to be rigidly fastened to a second shaft which is generally the driven shaft, a pressure plate, mounted for axial movement in relation to the reaction plate, a generally annular cover adapted to be fixed by its outer periphery to the reaction plate and to be rotationally fixed to the pressure plate, a generally annular diaphragm comprising a peripheral portion forming an elastic washer of the Belleville washer type for acting on the said pressure plate, and a central portion divided into radial fingers for the action of a movable control element known as the clutch release bearing, connection means pivotably fastening the diaphragm to the cover, and a supporting element interposed between the connection means and the diaphragm, these connection means comprising on the one hand a support head in contact with either the cover or the supporting element, and on the other hand claws which extend generally axially and pass through the diaphragm by extending through passages provided between the radial fingers thereof in the zone where these fingers are connected to the peripheral portion of the diaphragm forming an elastic washer, while beyond the diaphragm and the other of the two elements comprising the cover and the supporting element these claws are folded radially into contact with the other element.

In the construction of clutches of this type it is usual to assemble separately a first assembly comprising the cover and the diaphragm carried by the latter, and a second assembly comprising the pressure plate and fasteners adapted to enable the pressure plate to be rotationally fixed to the cover, and then to join these two assemblies together; finally this whole arrangement is fixed to the reaction plate after insertion of the friction disc.

The present invention relates more precisely to the first of the aforesaid assemblies, namely the assembly comprising the clutch cover and the diaphragm carried by it, but it also relates more generally to diaphragm clutches, whether such clutches are constructed by joining together two preassembled assemblies or by conjointly assembling the various component parts.

It is a main object of the present invention to provide a particularly simple and effective construction of the connection means which pivotably connect the diaphragm to the cover.

SUMMARY

According to the invention, the supporting head of these connection means, by which head these means are in contact with either the cover or the supporting element, forms at least a part of a cylinder whose generatices are parallel to the axis of the assembly, i.e. is of arcuate form.

This has the result that in a particularly simple and therefore economical operation, these connection means may be formed from a flat blank suitably cut out so as to form a bar which constitutes the supporting head, and teeth extending substantially perpendicularly of the bar and forming axial claws extending from the supporting head, this blank requiring, before being installed, no other working than simple bending to the radius of the circumference on which it is placed in position in the assembly on which it forms a part.

Furthermore, either the cover or the supporting element, with which the supporting head of the connection means constructed in this manner is in contact, is provided in the usual manner with apertures for the passage of the claws of the said connection means, and the perpendicular projection of the supporting head on this cover, parallel to the axis of the assembly, is through its very constitution, according to one embodiment of the invention, entirely contained between two circumferences, one of which externally encloses the said apertures, while the other encloses them internally.

As a result, the supporting head of the connecting means is supported on either the cover or the supporting element, as the case may be, between the openings in the said element and on a circumference which is advantageously in the direct axial extension of the axial claws of these connecting means which at their other end support the said connecting means on the other of the two elements; consequently this support is provided under particularly effective conditions for the desired connection.

BRIEF DESCRIPTION OF THE DRAWINGS

FIG. 2 is a partial view in axial section of this assembly, taken on the line II—II in FIG. 1;

FIG. 3 shows on a larger scale the detail of FIG. 2 enclosed in a box III in FIG. 2;

FIG. 4 is a partial view in section on the line IV—IV in FIG. 3;

FIG. 5 is a partial view in elevation in the direction of the arrow V in FIG. 3;

FIGS. 6, 7 and 8 are respectively similar views to FIGS. 3, 4 and 5 and relate to a modified embodiment;

FIGS. 9, 10 and 11 are likewise respectively similar views to FIGS. 3, 4 and 5 and relate to another modified embodiment;

FIG. 12 is a similar view to FIG. 3 and relates to another modified embodiment;

FIG. 13 is a partial view in elevation of this modified embodiment, taken in the direction of the arrow XIII in FIG. 12;

FIGS. 14 and 15 are respectively similar views to FIGS. 12 and 13 and relate to another modified embodiment.

DESCRIPTION OF THE PREFERRED EMBODIMENT

Figure 1:
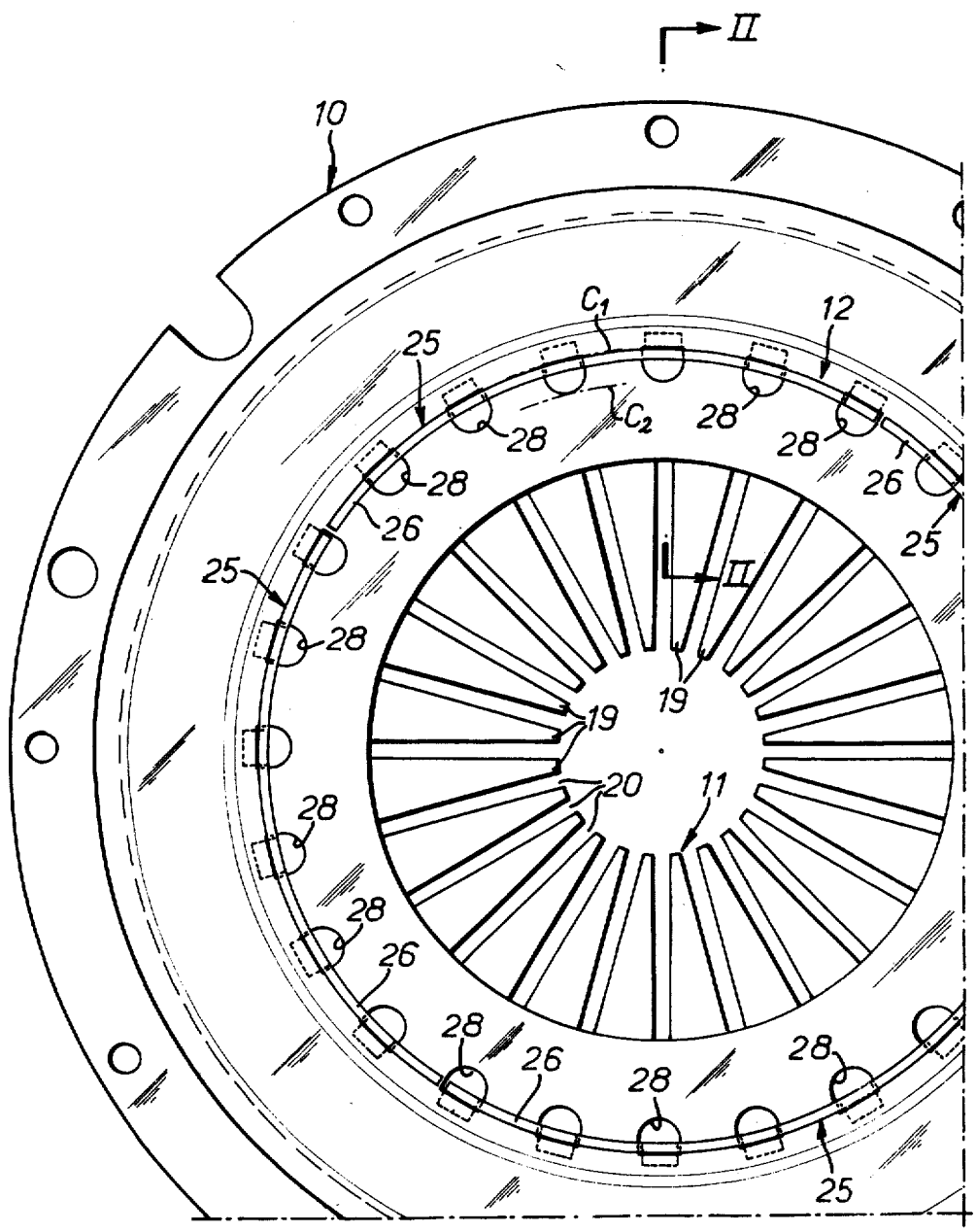
FIG. 1 is a partial view in elevation in the direction of the arrow 1 in FIG. 2 of a clutch assembly.

As shown in the drawings, and more particularly in FIGS. 1 and 2, an assembly for a diaphragm clutch according to the invention comprises generally and in known manner a first generally annular cover 10, a second generally annular diaphragm 11, connection means pivotably fastening the diaphragm 11 to the cover 10 and given the general reference 12, and a supporting element 13 interposed between these connection means 12 and the diaphragm 11.

Likewise in known manner, the cover 10 is provided on its periphery with a first series of coplanar areas by which it is adapted to be fixed to a reaction plate, either directly as diagrammatically indicated at 14 in dashed lines in FIG. 2, or with the interposition of spacers, and a second series of coplanar areas which are generally set back axially in relation to the first coplanar areas mentioned above and by which it is adapted to be connected by tongues to a pressure plate which is diagrammatically indicated in dashed lines 15 in FIG. 2 and is intended, under the action of the diaphragm 11, to press against the reaction plate 14 a friction disc 16 which is axially interposed between the reaction plate 14 and the pressure plate 15 and which is axially movable in relation to these plates.

Also in known manner the diaphragm 11 has a peripheral portion 18 forming an elastic washer of the Belleville washer type, and it is by this peripheral portion that it contacts the pressure plate 15.

This diaphragm 11 also has a central portion divided into radial fingers 19 separated into pairs by slits 20 originating from passages 21 provided between these radial fingers 19 in the zone in which the fingers are connected to the peripheral portion of the diaphragm 11 which forms the Belleville washer 18.

A movable control element known as the clutch release bearing (not shown in the drawings) is adapted to act on the free ends of these radial fingers 19.

The tongues rotationally fastening the pressure plate 15 to the cover 10 enable this pressure plate to have sufficient axial mobility to ensure that, when the clutch release bearing does not act on the radial fingers 19 of the diaphragm 11, this pressure plate can effectively clamp the friction disc 15 against the reaction plate 14 through the action of th peripheral portion 18 of the diaphragm.

In the example illustrated the supporting element 13 is a washer having a generally V-shaped form in section which bears against the diaphragm 11 by its median zone or apex.

These arrangements are well known in themselves and, since they do not form part of the present invention, they will not be described in any further detail.

On the contrary, a detailed description will be given only of the connecting means 12, which in fact form the object of the present invention.

In the example illustrated, these connecting means 12 are composed of a plurality of connecting elements 25 regularly distributed around the axis of the assembly, there being four of them in the example illustrated.

Each of these connecting elements 25 have a supporting head 26 by which it is in contact with the outer surface of the cover 10, and claws 27 which extend generally axially and which pass in succession through openings 28 provided for the purpose in the cover 10 and through the passages 21 provided between the radial fingers 19 of the diaphragm 11; beyond the supporting washer 13 the claws 27 are folded radially into contact with the washer to provide a pivotal connection.

In accordance with the invention, the supporting head 26 of a connecting element 25 of this kind forms a part of a cylinder which has a circular cross-section and generatrices parallel to the axis of the assembly.

The radius of this cylinder is the same for all the connecting elements 25, and it corresponds to the radius of the circumference of the cover 10 on which these connecting elements 25 are placed in position on the cover.

In practice, according to one characteristic of the invention, the perpendicular projection, on to the cover 10, of the support head 26 of a connecting element 25 parallel to the axis of the assembly is entirely contained between two concentric circumferences, one C1 of them externally enclosing the openings 28 of the cover 10 and the other C2 internally enclosing these openings 28 (FIGS. 1 and 4).

In other words, the support head 26 of the connecting element 25 bears on the cover 10 only between adjacent openings 28 and is in the extension of the axial claws 27 formed from the said element, with the exception of the folded-over ends of these claws.

As is clear, and as previously mentioned, a connecting element 25 of this kind can very simply be formed from a flat blank, by a suitable cutting-out and bending operation.

The connecting element thus has the general appearance of a comb which is slightly bent and its positioning consists simply of introducing the free ends of the teeth or axial claws of this comb into the openings 28 of the cover 10, and then into the passages 21 in the diaphragm 11.

It is then sufficient for the ends of the teeth or claws in question to be folded over into contact with the supporting washer 13.

In the example illustrated in FIGS. 1 and 3, these ends are folded over substantially at right angles.

By pivoting in the folding zone of the axial claws 27, the supporting washer 13 permits during operation the rocking of the diaphragm 11 between its supports, which is necessary for its operation.

In order to avoid acccidental radial displacement of a connecting element 25 after it has been placed in position, the invention provides for radial retaining means to be associated with at least one of the axial ends of the axial claws 27.

In the example illustrated in FIGS. 1 to 4, these radial retaining means are provided only for the end of the axial claws 27 by which the claws are connected to the corresponding support head 26; these radial retaining means are formed in practice through the fact that for at least one of the axial claws 27, (in practice for each of these claws), the corresponding opening 28 of the cover 10 has a profile formed by a part of a circle 30 (FIG. 4) whose concavity is turned towards the periphery of the cover 10 and the ends of which are connected to one another by an upper edge 31 substantially forming a tangent to the corresponding circumference of the cover 10; the outer peripheral edge 32 of corresponding axial claw 27 of the connecting element 25 bears against the edge 31 of the corresponding opening 28, and, by the circumferential end of its inner peripheral edge 33, is in contact with the lower circular edge 30 of the opening 28; there is therefore a three-point support of each axial claw 27 around the edges of the corresponding opening 28.

In the modified embodiment illustrated in FIGS. 6 to 8, radial retaining means are provided at each side of the axial claws 27 of each connecting element 25.

In the case where the radial retaining means are located at the opposite axial end of the said claws to the supporting head 26, the retaining means are formed by virtue of the fact that, as previously, the turned-over end of the said claws is folded over radially in the direction of the periphery of the cover 10 and into contact with the supporting washer 13, and forms with the axial portion of the claws 27 an angle smaller than 90°.

In the case where the radial retaining means are located at the same end of the axial claws 27 as the supporting head 26, the radial retaining means of the connecting element 25 in question are formed by the provision on the corresponding opening 28 of the cover 10 of two shoulders 34, 34' circumferentially spaced from one another on the same circumference, the corresponding sides of the claws 27 bearing against the said shoulders (FIG. 7).

Furthermore, whereas previously the supporting washer 13 was situated entirely radially beyond the axial claws 27 of the connecting elements 25, in the example illustrated in FIGS. 6 to 8 this supporting washer 13 is provided on its inner periphery with cut-outs 36 (FIGS. 6 and 8), by which it radially engages the axial claws 27, thereby contributing towards circumferential support and to a certain extent increasing its radial rigidity.

However this may be, as previously, the supporting washer 13 has generally, in known manner, a V-shaped form in section and bears on the diaphragm 18 by its median zone, along a circumference having a radius substantially equal to the circumference on which the diaphragm 18 is supported against the cover 10; this circumference nevertheless has a radius substantially larger than that of the circumference on which the connecting elements 25 act on the supporting washer 13 by the folded-over end of their axial claws 27.

The modified embodiment illustrated in FIGS. 9 to 11 is substantially similar to that illustrated in FIGS. 1 to 4, but on the one hand the part of a circle 30 of an opening 28 of the cover 10 has an angular opening smaller than 180°, (in the embodiment illustrated in FIGS. 1 to 4 the opening is larger than 180°), so that for equal circumferential tolerances the possible radial play is reduced. In addition, the supporting washer 13 is extended radially towards the axis of the assembly, beyond the axial claws 27 or the connecting elements 25, and thus is provided with openings 38 for the passage of these axial claws.

In the embodiment shown in solid lines in FIG. 9, the folded-over ends of the axial claws 27 are directed in the opposite direction to the axis of the assembly; as shown in dashed lines in this Figure, they are directed towards the axis.

In the foregoing the element against which the supporting head 26 bears is the cover 10.

In a modified embodiment shown in FIGS. 12 to 14, this element is the supporting washer 13.

In the embodiment illustrated in FIGS. 12 and 13 the free ends of the axial claws 27 are folded over radially into contact with the cover 10 in the direction of the axis of the assembly.

As an alternative shown in FIGS. 14 and 15, the ends of the claws are folded over radially in the opposite direction to the axis of the assembly, that is to say in the direction of the periphery.

In all cases the claws 27 pass through openings 38 in the supporting washer 13, and these openings have a substantially rectangular contour complementary to the cross-sections of a claw of this kind, as previously described.

The radial retention of the connecting elements 25 at their supporting heads 26 is thus achieved, and such retention may also be effected at the other axial end of the claws 27, if as illustrated, the free ends of the latter are folded over at an angle smaller than 90°.

The present invention is not limited to the embodiments described and illustrated, but includes any alternative construction and/or combination of their various elements within the scope of the appended claims.

In particular, any number of connecting elements 2 may be used; there may for example be a single connecting element of cylindrical form, its circumferential ends being brought face to face or being joined to one another.

Furthermore, when a plurality of separate connecting elements 25 are used, they are not necessarily circularly contiguous in pairs as illustrated in FIG. 1; they may on the contrary be circularly spaced apart from one another.

In addition, as will have been understood, the radial retention means which may be associated with at least one of the axial ends of the axial claws of these connecting elements make it possible to avoid accidental radial displacement of the elements while providing in known manner for the connection which they form, the limited play necessary for the rocking of the diaphragm 11 between its supports on the washer 13 and on the cover 10 during a clutch disengagement and/or engagement operation.

Moreover, the shape of the openings 28 in the cover, at the point where an axial claw 27 is engaged, may be complementary to the cross-sections of a claw of this kind and therefore extend circularly.

Finally, the supporting element 13 is not necessarily a washer; as an alternative, it may for example be a simple ring.

I claim:

1. An assembly for a diaphragm clutch, comprising a generally annular cover element adapted for connection to a reaction plate, means for fixing the cover element for rotation with a pressure plate, a generally annular diaphragm having a peripheral portion forming an elastic washer of the Belleville washer type adapted to act on the said pressure plate and a central portion divided into radial fingers for operation by a clutch release bearing, connecting means pivotably fastening the diaphragm to the cover element, and a support element interposed between the connecting means and the diaphragm, the connecting means having at one end a support head in contact with either the cover element or the supporting element, and at the other end claws which extend generally axially and pass through passages formed in the diaphragm between the radial fingers thereof, in the zone in which the fingers are connected to said peripheral portion of the diaphragm, the ends of the said claws passing through the other of said elements and being folded radially into contact with this element, and the supporting head of the said connecting means forming at least a part of a cylinder whose generatrices are parallel to the axis of the assembly.

2. An assembly according to claim 1, wherein the element against which the supporting head of the connecting means bears is provided with openings for the passage of the claws of the connecting means, and the perpendicular projection of the supporting head onto the element, parallel to the axis of the assembly, is entirely contained within two concentric circumferences one of which encloses the openings externally and the other of which encloses the openings internally.

3. An assembly according to claim 1, wherein radial retention means are associated with at least one of the axial ends of the claws.

4. An assembly according to claim 3, wherein said radial retention means are located at the end of the claw remote from the supporting head and comprise the folding over of the free end of the claw against the adjacent element by an angle which is smaller that 90°.

5. An assembly according to claim 3, wherein the element against which the supporting head of the connecting means bears is provided with openings for the passage of the claws therethrough, the radially innermost part of said openings being formed as an arc of a circle and the ends of the arc being connected by the radially outermost edge of the opening to form said retention means, the outer peripheral edge of the respective claw bearing against the outermost edge of the opening and the circumferential ends of the inner peripheral edge of the claw being in contact with the said circular, radially innermost, part of the opening.

6. An assembly according to claim 3, wherein openings are formed in the cover for the passage of the claw therethrough, and said radial retention means comprise at least one shoulder formed in the edges of the opening against which the corresponding circumferential edge of the claw bears.

7. An assembly according to claim 1, wherein the supporting element is a washer provided on its inner periphery with cutouts by which it radially engages with the axial claws of the connecting means.

8. An assembly according to claim 1, wherein the supporting head of the connecting means is in contact with the cover element.

9. An assembly according to claim 1, wherein the supporting head of the connecting means is in contact with the supporting element interposed between the said connecting means and the diaphragm.

10. An assembly according to claim 1, wherein the folded-over ends of the claws are directed radially towards the axis of the assembly.

11. A diaphragm clutch incorporating an assembly as claimed in claim 1.

* * * * *